United States Patent
Simon

(10) Patent No.: US 7,463,696 B2
(45) Date of Patent: Dec. 9, 2008

(54) TRANSMISSION ARRANGEMENT

(75) Inventor: Martin Simon, Otterfing (DE)

(73) Assignee: Infineon Technologies AG, Munich (DE)

( * ) Notice: Subject to any disclaimer, the term of this patent is extended or adjusted under 35 U.S.C. 154(b) by 751 days.

(21) Appl. No.: 10/935,414

(22) Filed: Sep. 7, 2004

(65) Prior Publication Data

US 2005/0078766 A1    Apr. 14, 2005

Related U.S. Application Data

(63) Continuation of application No. PCT/DE03/00537, filed on Feb. 20, 2003.

(30) Foreign Application Priority Data

Mar. 4, 2002    (DE) ............................ 102 09 516

(51) Int. Cl.
*H04L 27/00* (2006.01)
*H04B 1/02* (2006.01)
(52) U.S. Cl. .................................... 375/295; 455/91
(58) Field of Classification Search ............... 375/261, 375/295, 268, 269, 279–280, 298, 269.298, 375/302, 303, 308; 455/91
See application file for complete search history.

(56) References Cited

U.S. PATENT DOCUMENTS

| 6,208,875 B1 | 3/2001 | Damgaard et al. | |
| 6,369,666 B1* | 4/2002 | Simon et al. | 332/100 |
| 6,546,044 B1* | 4/2003 | Dent | 375/216 |
| 7,177,370 B2* | 2/2007 | Zhang et al. | 375/297 |
| 2002/0168019 A1* | 11/2002 | Bengtsson et al. | 375/295 |
| 2005/0078766 A1* | 4/2005 | Simon | 375/296 |
| 2007/0018718 A1* | 1/2007 | Horng et al. | 330/10 |

FOREIGN PATENT DOCUMENTS

| DE | 199 56 073 A1 | 5/2001 |
| EP | 0 853 374 B1 | 7/1998 |
| GB | 2 352 945 A | 2/2001 |
| WO | WO 98/17012 A1 | 4/1998 |
| WO | WO 03/075476 | * 2/2003 |

* cited by examiner

*Primary Examiner*—Tesfaldet Bocure
(74) *Attorney, Agent, or Firm*—Eschweiler & Associates, LLC

(57) ABSTRACT

A transmission arrangement is disclosed in which two different signal paths are provided for two operating modes, in order to couple a baseband signal processing unit to a radio-frequency mixer for transmission of the modulation signal. In a first operating mode, the frequency mixer operates as a step-up frequency mixer, and converts a baseband modulation signal to radio frequency. In a second operating mode, a frequency generator is supplied with a signal that is dependent on the modulation signal and is just amplified in the frequency mixer. The described transmission arrangement supports both the conventional GSM standard and the extended GSM EDGE with higher transmission rates. The transmission arrangement in this case has good noise characteristics with a low power consumption.

14 Claims, 2 Drawing Sheets

TRANSMISSION ARRANGEMENT

REFERENCE TO RELATED APPLICATIONS

This application is a continuation of PCT/DE03/00537, which was not published in English, that claims the benefit of the priority date of German Patent Application No. DE 102 09 516.7, filed on Mar. 4, 2002, the contents of which both are herein incorporated by reference in their entirety.

FIELD OF THE INVENTION

The present invention relates to a transmission arrangement, and more particularly, to a transmission arrangement operable to handle transmission of signals that in one instance are phase and/or frequency modulated, and in another instance are phase and amplitude modulated.

BACKGROUND OF THE INVENTION

According to the widespread GSM (Global System for Mobile Communication) mobile radio standard, phase modulation and frequency modulation are used for processing digital data to be transmitted. In this case, Gaussian Minimum Shift Keying (GMSK) is normally used for digital modulation of the data to be transmitted, in which the payload signal information is not coded in the signal amplitude of the radio signal to be transmitted via a channel, but only in the phase and/or frequency.

The demand for higher transmission rates in mobile radio has lead to the introduction of modulation methods for higher data rates, such as the extension to the GSM Standard, the so-called GSM EDGE system. In this case, the signal information is represented by a combination of phase and amplitude keying. The abbreviation EDGE in this case stands for Enhanced Data Rates for GSM Evolution. EDGE allows transmission rates which are comparable to UMTS (Universal Mobile Telecommunications System).

In GSM systems which operate using GMSK modulation methods, the transmission architectures are normally based on phase locked loops which use a VCO (Voltage Controlled Oscillator) which is driven by the modulation signal, or phase locked loops with a delta-sigma modulator are used. Transmission arrangements such as these have a good noise response with a low power consumption, and do not require any additional surface acoustic wave filters at their output.

Alternatively, it is also possible to use transmission architectures with a quadrature modulator. In this case, the quadrature modulator may, for example, be in the form of a vector modulator, and may be driven by a complex-value baseband signal. In this case, direct conversion to the transmission frequency band is normally provided. However, quadrature modulators such as these have the disadvantage that the power consumption is relatively high in order to achieve acceptable noise characteristics. Furthermore, an external surface acoustic wave filter is required for bandpass filtering on the output side.

While the quadrature modulator described most recently above is suitable for processing phase-modulated and amplitude-modulated signals, such as those which occur with GSM EDGE, no amplitude information can be processed when using the power-saving architectures in which a VCO is driven with a radio-frequency signal that has already been modulated.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a transmission arrangement that is suitable not only for phase-modulated and frequency-modulated signals that are not amplitude-modulated, but also for phase-modulated and amplitude-modulated signals, which in this case has a relatively low power consumption in the respective operating modes.

According to the invention, the transmission arrangement comprises a baseband signal processing unit that produces a modulation signal at its output, and a frequency mixer, designed for operation in two operating modes. The arrangement further includes a frequency generator that is coupled to a first input of the frequency mixer for driving thereof. A first transmission signal path is provided that couples the output of the baseband signal processing unit to a second input of the frequency mixer, with the frequency mixer operating as a step-up frequency converter in the first operating mode. Lastly, the arrangement comprises a second transmission signal path, which couples the output of the baseband signal processing unit to the frequency generator, with the frequency mixer operating as an amplifier in the second operating mode.

On the basis of the present invention, two transmission architectures are advantageously combined with one another. In the first operating mode, phase-modulated and amplitude-modulated signals are processed by means of the first signal path and the frequency mixer. In this operating mode, for example 8-PSK modulation, the frequency mixer operates as a step-up frequency converter. In this case, no surface acoustic wave filters are required, because the noise requirements are not very strict, owing to the low output current.

The frequency generator is driven with a modulated signal by means of the second transmission signal path. In the second operating mode, the frequency mixer operates only as an amplifier.

In the first operating mode, the frequency generator preferably produces a signal at a carrying frequency, with the frequency mixer in this operating mode using the signal that is produced by the frequency generator or a signal that is derived therefrom by frequency division or frequency multiplication, in order to convert the modulation signal to radio-frequency.

The output stage of the transmission arrangement, that is to say the frequency mixer, is accordingly advantageously used in both operating modes of the transmission arrangement.

In accordance with one aspect of the invention, the overall transmission arrangement offers the capability to support both conventional GSM systems, that operate with GSMK modulation, and extended systems based on GSM EDGE for higher data rates.

In this case, the respectively applicable noise requirements are in each case achieved with a comparatively low power consumption. There is no need for a surface acoustic wave filter (SAW) or an additional surface acoustic wave filter (SAW) at the output of the frequency mixer in either of the two operating modes.

Since, on the basis of the proposed invention, numerous functional units in the transmission arrangement can be used in both operating modes, the proposed transmission arrangement can be produced in the form of integrated circuits, occupying comparatively little space.

The proposed transmission arrangement can process both analog and digital modulation signals, with the modulation signal preferably being digitally coded in the second operating mode and preferably being analog-coded in the first operating mode, and being in a suitable form for being supplied to frequency mixer inputs.

According to one preferred development of the present invention, the frequency generator is arranged in a phase locked loop, which has a control input that is coupled to the output of the baseband signal processing unit.

The phase locked loop preferably has a controlled oscillator, a phase detector that drives the oscillator, a loop filter for coupling the phase detector and the oscillator, and a feedback path, that couples the output of the oscillator to an input of the phase detector. A further input of the phase detector is preferably connected to a reference frequency source.

A modulator has a control input that is connected to the output of the baseband signal processing unit in order to transmit the preferably digitally coded modulation signal. The modulator is preferably arranged in the feedback path of the phase locked loop. The controlled oscillator is thus driven by a control signal that depends on the output frequency from the oscillator and on the modulation signal.

The modulator in the feedback path is preferably in the form of a fractional N-divider, and allows GSMK modulation with a low power consumption and good noise characteristics. The modulator is preferably in the form of a delta-sigma modulator, whose control input may be coupled directly to the baseband signal processing unit, for example to a digital signal processor.

In order to process complex-value modulation signals, the frequency mixer is preferably in the form of a quadrature modulator, for example a vector modulator. In this case, the frequency mixer has a first mixer and a second mixer, which are each driven by one signal component of the complex-value modulation signal. In this case, the first inputs of the frequency mixers are connected to the frequency generator output, while the second inputs of the frequency mixers are coupled to the baseband signal processing unit. In this case, one in-phase signal branch and one quadrature signal branch are preferably provided.

The in-phase signal branch and quadrature signal branch in the first signal path preferably each have a digital/analog converter, with each having an output which is connected to the baseband signal processing unit, and each having an output that is coupled to a respectively associated frequency mixer.

The frequency mixer preferably has a control input for switching between the first and the second operating mode. In this case, the mixer function of the frequency mixer can be switched off in the second operating mode, so that the frequency mixer operates only as an amplifier or buffer amplifier in the second operating mode.

The frequency mixer preferably has four differential amplifiers, two of which are in each case associated with the first frequency mixer and two are in each case associated with the second frequency mixer, and each have a feed current path for supplying current to the differential amplifiers. In this case, the feed current to three of the four differential amplifiers is preferably interrupted during the second operating mode. The differential amplifiers in this case have control inputs that are preferably connected to the frequency generator, possibly via a frequency divider. The feed current paths of the differential amplifiers in the first operating mode are preferably connected to the baseband signal processing unit, in order to supply modulated feed currents.

BRIEF DESCRIPTION OF THE DRAWINGS

The invention will be explained in more detail in the following text using an exemplary embodiment and with reference to the drawings, in which.

DETAILED DESCRIPTION OF THE INVENTION

Figure 1:
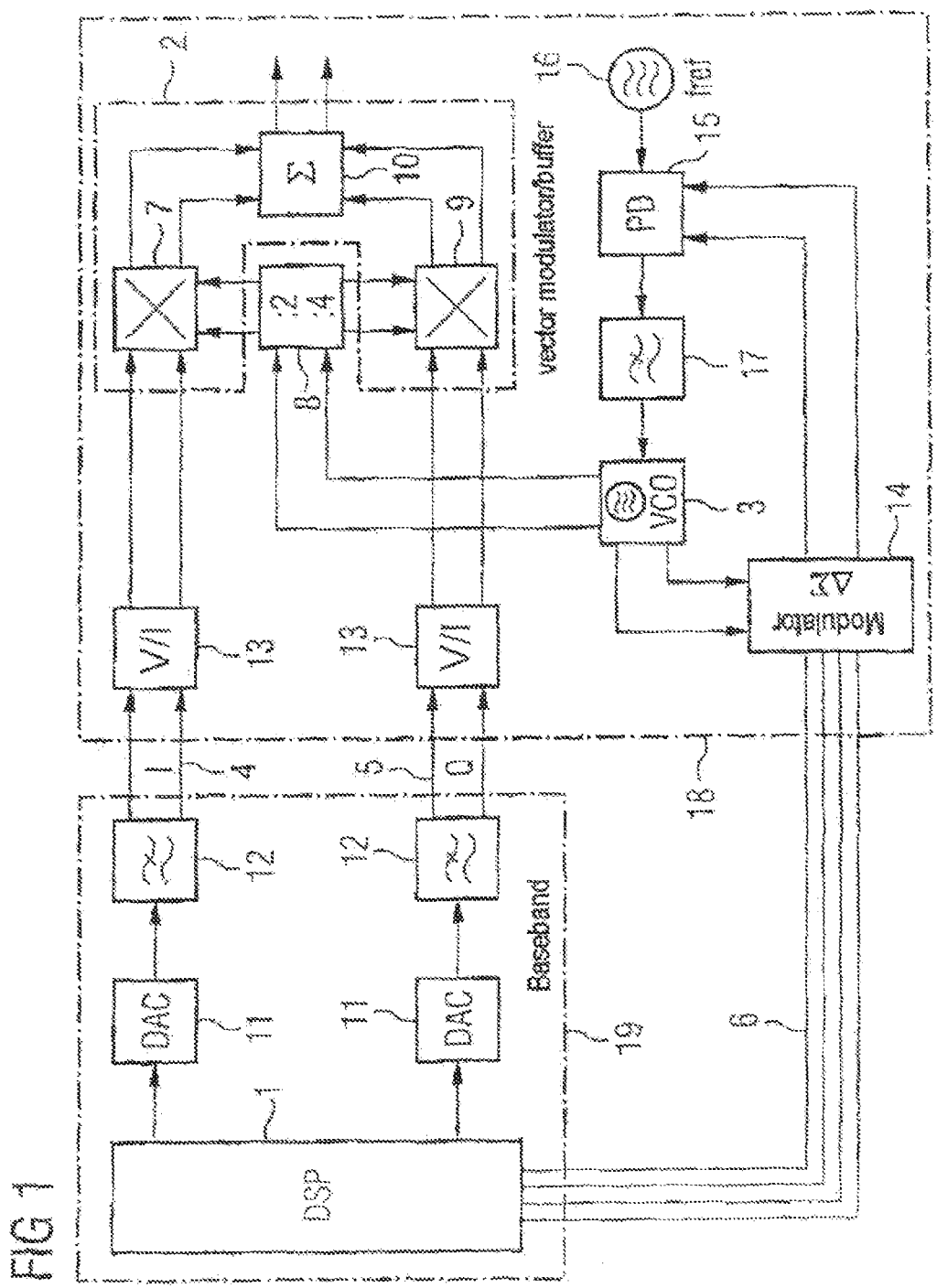
FIG. 1 shows a first exemplary embodiment of the present invention, using a simplified block diagram.

FIG. 1 shows a transmission arrangement comprising a baseband signal processing unit 1, a frequency mixer 2 coupled to it and a frequency generator 3. A first signal path 4, 5 couples one output of the baseband signal processing unit 1, at which it produces a modulation signal, to a second input of the frequency mixer 2, whose first input is coupled to the frequency generator 3. A second transmission signal path 6 couples the output of the baseband signal processing unit 1 to a phase locked loop 3, 14, 15, 17, which includes the frequency generator 3.

The frequency mixer 2, which is in the form of a vector modulator, has a first frequency mixer 7 that is designed for balanced signal processing, having a first input that is coupled to a frequency divider 8, and having a second input that is coupled to an in-phase branch 4 of the first signal path 4, 5. The frequency mixer 2 also has a second frequency mixer 9, having a first input that is likewise connected to one output of the frequency divider 8, and having a second input which is connected to one quadrature branch 5 of the first signal path 4, 5. The second frequency mixer 9 is likewise designed to be balanced, in order to process differential signals.

The first and second frequency mixers 7, 9 each have an output that is connected to a respective input of a logic gate 10. The output of the logic gate 10 forms the output of the transmission arrangement. The first and second signal paths 4, 5 each have a digital/analog converter 11 with a downstream low-pass filter 12, that is connected to the output of the baseband signal processing unit 1. These, as well as the converters 11 and the low-pass filters 12, are jointly arranged in a baseband block 19, which is in the form of an integrated circuit. A voltage/current converter 13 is in each case connected to the outputs of the low-pass filters 12. The outputs of the voltage/current converters 13 are each connected to a second input of the frequency mixers 7, 9 using a differential circuit technique. The input of the frequency divider 8, which has a division ratio that can be switched between a factor of two and a factor of four, is connected to the output of a voltage controlled oscillator 3. A further output of the voltage controlled oscillator 3 is connected to a delta-sigma modulator 14, which is in the form of a fractional N-divider. The delta-sigma modulator 14 has a control input that is connected by means of the second signal path 6 to one output of the baseband signal processing unit 1. In order to form a phase locked loop, a phase detector 15 is provided, having a first input that is connected to the output of the delta-sigma modulator 14, and having a second input that is connected to a reference frequency generator 16. The output of the phase detector 15 is connected to the voltage control input of the oscillator 3 via a low-pass filter 17, which is in the form of a loop filter. The blocks 3, 14, 15 and 17 accordingly form the phase locked loop. This phase locked loop 3, 14, 15, 17 as well as the frequency mixer 2 and voltage/current converters 13 are formed jointly in a further integrated circuit, which is in the form of an RF block and is annotated with the reference symbol 18.

The frequency mixer 2 operates as a set-up frequency mixer in a first operating mode, and as an amplifier in a second operating mode.

In the first operating mode, a modulation signal that is in the form of a complex-value signal I, Q and is produced by the digital signal processor 1 is converted to a corresponding analog signal, is low-pass filtered, and is converted from a voltage signal to a current signal. After being processed in this way, the modulation signal is, in the first operating mode, stepped up by direct conversion in the frequency mixer 2 to the desired radio-frequency transmission frequency. For this purpose, in the first operating mode, the frequency generator 3 produces a carrier frequency, that is divided by two or by four in the frequency divider 8 depending on the desired transmission band, and is supplied to the quadrature modulator 7, 9. Since the present transmission arrangement as shown in FIG. 1 is designed for the GSM mobile radio standard, the VCO 3 operates at 3.6 GHz in the first operating mode, so that both GSM 900 and GSM 1800 are supported by means of the frequency divider.

In the present exemplary embodiment, the frequency mixer 2 accordingly operates as a vector modulator in the first operating mode. The transmission architecture that is provided in the first operating mode allows modulation signals to be processed that have an amplitude modulation component, as is envisaged in the extended GSM EDGE standard. Owing to the low output power, no surface acoustic wave filter is required at the output of the frequency mixer 2, in order to comply with the applicable noise requirements in this case.

In the second operating mode of the transmission arrangement, the voltage/current converters 13 produce only a DC signal at the second inputs of the frequency mixers 7, 9. In this operating mode, the frequency mixers 7, 9 operate as amplifiers, without any frequency conversion. The actual modulation in the second operating mode is in fact carried out in the phase locked loop 3, 14, 15, 17. The input of the delta-sigma modulator 14 is supplied with the modulation signal via the second signal path 6. The signal produced by the oscillator 3 at its output is modulated or stepped down as a function of the modulation signal. The feedback signal which has been modulated in this way is compared in the phase detector 15 with a reference signal, and the voltage controlled oscillator 3 is driven via a loop filter 17 as a function of this phase and/or frequency error. Accordingly, in the second operating mode, a radio-frequency modulated signal in the 3.6 GHz frequency band is actually provided at the output of the oscillator 3, and is stepped down in the frequency divider 8 by a factor of either two or four to the 1800 or 900 MHz frequency bands, depending on the desired GSM transmission band. Only phase information and frequency information in the modulation signal can be processed in the second operating mode, while amplitude information cannot. In the second operating mode, the transmission arrangement operates as a transmitter with a modulated VCO and thus intrinsically has particularly low noise, with a low power consumption. No surface acoustic wave filter is advantageously required at the output of the frequency mixer 2 in this operating mode, either.

The described transmission arrangement is, overall, suitable not only for conventional GMSK modulation, but also for the extended GSM EDGE, which allows high data transmission rates, similar to the UMTS standard. The described transmission arrangement does not require an expensive surface acoustic wave filter at the output in either of the two described operating modes, and, because of this and because of the described power-saving characteristics, is particularly suitable for mass production and for use in mobile radios.

Finally, in both operating modes, the described transmission arrangement supports so-called dual band, that is to say it can operate not only at 900 MHz but also at 1800 MHz.

Figure 2:
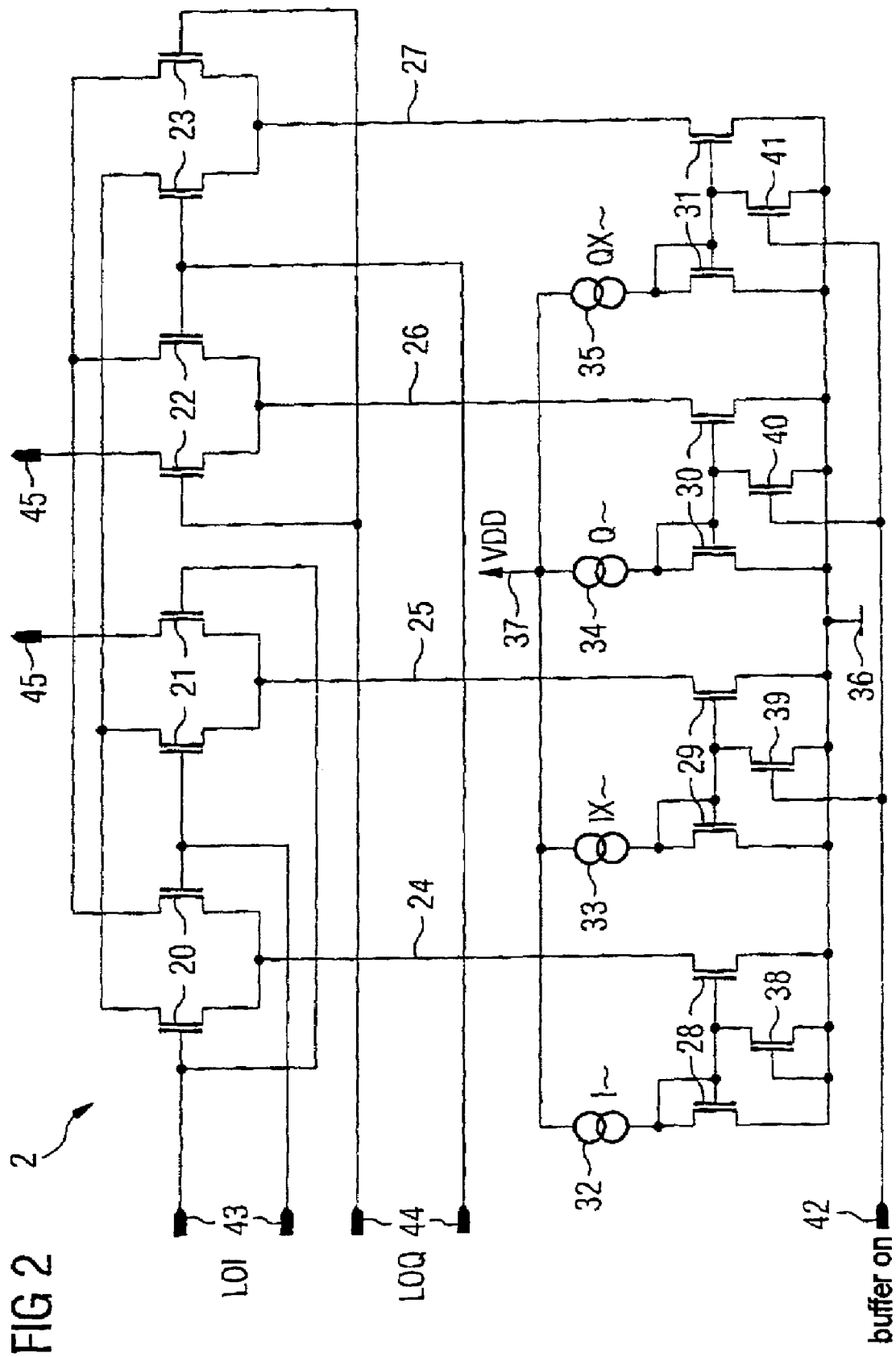
FIG. 2 shows an exemplary embodiment of the frequency mixer shown in FIG. 1, based on a circuit diagram.

FIG. 2 uses a circuit diagram to show one exemplary embodiment of the frequency mixer 2 as shown in FIG. 1, that operates as a step-up frequency converter in the first operating mode, and as a buffer amplifier in the second operating mode.

The radio-frequency mixer 2, in the present example, is designed entirely using Complementary Metal Oxide Semiconductor (CMOS) circuit technology, and has four differential amplifiers 20, 21, 22, 23, each of which comprises two MOS transistors. These are in each case connected to one another at their sources in pairs, and are connected to a feed current path 24, 25, 26, 27. The feed current paths 24 to 27 are connected via a respective current mirror 28, 29, 30, 31 to a controlled current source 32, 33, 34, 35. Furthermore, the current mirrors 28 to 31 are connected to a reference potential connection 36. The controlled current sources 32 to 35 are connected to a supply potential connection 37. The current mirrors 28 to 31 each comprise two MOS transistors, a first of which is in each case connected as a diode. Furthermore, each current mirror 28 to 31 has a further MOS transistor, whose controlled path is connected on the one hand to the gate connections of the respective current mirror transistors, while its further load connection is connected to the reference potential connection 36.

While the further transistor 38 in the current mirror 28 is connected as a diode, the further transistors in the current mirrors 29 to 31, which are annotated by the reference symbols 39 to 41, are in the form of switching transistors, whose control inputs are connected to one another and to a control input 42 of the frequency mixer 2. The control connections of the differential amplifiers 20 to 23, which operate as mixer cells, are each connected in pairs to balanced circuit inputs of the frequency mixer 2, to which the in-phase component as well as the quadrature component of a local oscillator signal can be supplied and that, for example, can be connected to a frequency generator via a frequency divider. In this case, the differential amplifiers 20, 21 represent the first frequency mixer 7, and the differential amplifiers 22, 23 represent the balanced second frequency mixer 9, as shown in FIG. 1. The inputs, that are connected in pairs to the gate connections of the differential amplifier transistors 20 to 23, are annotated by the reference symbols 43, 44. The inputs 43, 44 are connected to the frequency divider 8 in the illustration shown in FIG. 1. The second inputs of the frequency mixers 7, 9 are the control inputs of the controlled current sources 32 to 35. In this case, the current sources 32, 33 form the balanced input of the first frequency mixer 7, and the control inputs of the controlled current sources 34, 35 form the quadrature input of the frequency mixer 2, that is to say the second input of the frequency mixer 7.

Those connections of the controlled load paths of the transistors in the differential amplifiers 20 to 23 which are not connected to the feed current paths 24 to 27 are each crosscoupled to one another in pairs in order to form mixer cells, with the in-phase mixer cells 20, 21 and the quadrature mixer cells 22, 23 being connected in parallel with one another, jointly forming the balanced output 45 of the frequency mixer 2.

In the first operating mode, the switches 39 to 41 of the current mirrors 29 to 31 are open, so that the differential amplifiers 20 to 23 can be fed from the respectively associated controlled current sources 32 to 35. In this operating mode, the frequency mixer 2 accordingly operates as a quadrature modulator, that mixes the quadrature components (that are applied to the first inputs) of a complex-value carrier signal with the modulation data which is applied to the second inputs 43, 44 and is likewise in the form of a complex-value signal, thus converting the modulation signal from baseband to radio-frequency.

In the second operating mode, which is activated by application of a high level to the control input 42 of the frequency mixer 2, the transistor switches 39 to 41 are closed, so that direct currents and not control currents are applied to the mixer cells 20 to 23, and those parts of the mixer cells that are not required are disconnected by means of the MOS switches 39 to 41. Thus, in a second operating mode, the frequency mixer 2 operates as a limiting amplifier (limiter). The branches 25 to 27 are accordingly switched off in the second operating mode, while the current branch 24 drives the differential amplifier 20 as a buffer amplifier. In the second operating mode, the current source 32 accordingly does not act as a control current source, but as a constant current source.

Since the frequency generator 3, the frequency mixer 2 and the baseband signal processing unit 1 are used in both operating modes of the transmission arrangement, it can be produced such that it occupies a small surface area, and at low cost.

Instead of the embodiment based on CMOS circuit technology, the frequency mixer 2 that can be used in two different operating modes can also be produced by means of bipolar or BICMOS circuit technology within the scope of the proposed invention.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

The invention claimed is:

1. A transmission arrangement, comprising
   a baseband signal processing unit configured to produce a modulation signal at its output;
   a frequency mixer configured to operate in first and second operating modes;
   a frequency generator coupled to a first input of the frequency mixer and operable to drive the frequency mixer;
   a first transmission signal path that couples the output of the baseband signal processing unit to a second input of the frequency mixer, wherein the frequency mixer operates as a step-up frequency converter in the first operating mode; and
   a second transmission signal path that couples the output of the baseband signal processing unit to the frequency generator, wherein the frequency mixer operates as an amplifier in the second operating mode.

2. The transmission arrangement as claimed in claim 1, wherein the frequency generator is arranged in a phase locked loop that has a control input that is coupled to the output of the baseband signal processing unit.

3. The transmission arrangement as claimed in claim 2, further comprising a modulator arranged in a feedback path in the phase locked loop and comprising the control input for the phase locked loop, and configured to modulate a fed-back output signal from the frequency generator with the modulation signal of the baseband signal processing unit.

4. The transmission arrangement as claimed in claim 3, wherein the modulator comprises a delta-sigma modulator.

5. The transmission arrangement as claimed in claim 1, wherein the frequency mixer comprises a quadrature modulator, comprising a first frequency mixer and a second frequency mixer, each having a first input and a second input, with the first inputs of the first and second frequency mixers are coupled to the frequency generator, and the second inputs of the first and second frequency mixers are coupled to the baseband signal processing unit, the first and second frequency mixers configured to process the modulation signal that is in the form of a complex-value signal.

6. The transmission arrangement as claimed in claim 5, further comprising a frequency divider configured to couple the frequency generator to the first inputs of the first and second frequency mixers.

7. The transmission arrangement as claimed in claim 5, further comprising a digital/analog converter coupled in the first signal path, and configured to process the complex-value modulation signal, wherein the digital/analog converter comprises an output that is coupled to a respective second input of the frequency mixers.

8. The transmission arrangement as claimed in claim 1, wherein the frequency mixer comprises a control input configured to switch off a mixer function of the frequency mixer in the second operating mode.

9. The transmission arrangement as claimed in claim 5, wherein the frequency mixer comprises four differential amplifiers configured to provide signal multiplication, each differential amplifier comprising a feed current path configured to supply current to the differential amplifiers, respectively, and wherein three of the four differential amplifiers comprise a device for feed current interruption configured to interrupt a feed current in the feed current path during the second operating mode.

10. The transmission arrangement as claimed in claim 9, wherein the feed current paths of the three differential amplifiers that are configured to be interrupted each comprise a current mirror configured to be switched off.

11. The transmission arrangement as claimed in claim 1, wherein the frequency mixer is designed using CMOS circuit technology.

12. A transmission system, comprising:
    a baseband signal processing unit configured to provide a complex modulation signal on a first signal path output, and a non-complex modulation signal on a second signal path output;
    a frequency generator operably coupled to the second signal path output, and operable to provide a signal at a carrying frequency at an output in a first operating mode, and operable to provide a processed modulation signal at the output based on the non-complex modulation signal in a second operating mode;
    a frequency mixer configured to receive the complex modulation signal at the first signal path output and the carrying frequency signal, and operate as a step-up frequency converter in the first operating mode, thereby converting the complex modulation signal to a radio frequency signal, and wherein the frequency mixer is further configured to receive a DC signal at the first signal path output and the processed modulation signal from the frequency generator in the second mode of operation, and operate as an amplifier to amplify the processed modulation signal in the second mode of operation.

13. The transmission system of claim 12, further comprising:
   a modulator operably coupled to the frequency generator; and
   a phase detector operably coupled to the modulator, wherein frequency generator, modulator and phase detector collectively form a phase locked loop circuit, wherein the phase locked loop circuit is operable to receive the modulation signal at the second signal path output in the second operating mode, process the modulation signal, and provide the processed modulation signal to the frequency mixer in the second operating mode.

14. The transmission system of claim 13, wherein the frequency mixer comprises:
   four differential amplifiers;
   four feed current paths associated with the four differential amplifiers, respectively;
   four current mirror circuits coupled to the four differential amplifiers through the four feed current paths, respectively;
   four controlled current sources operably coupled to the four current mirror circuits, respectively, wherein a current value associated with the four controlled current sources is controlled by the baseband system; and
   a turn-off circuit associated with three of the four current mirror circuits, and configured to de-activate the three current mirror circuits associated therewith in the second operating mode, wherein the remaining current mirror circuit that is not de-activated operates in conjunction with the respective differential amplifier, feed current path, and controlled current source as an amplifier.

* * * * *